US011897126B2

(12) United States Patent
Ejstrup Hansen et al.

(10) Patent No.: US 11,897,126 B2
(45) Date of Patent: Feb. 13, 2024

(54) SYSTEM FOR CONNECTING AN AUTONOMOUS MOBILE ROBOT

(71) Applicant: ROEQ APS, Vissenbjerg (DK)

(72) Inventors: Michael Ejstrup Hansen, Morud (DK); Benedikt Snævar Sigurgeirsson Lund, Aarup (DK); Carsten Sørensen, Herlev (DK)

(73) Assignee: Roeq ApS, Vissenbjerg (DK)

( * ) Notice: Subject to any disclaimer, the term of this patent is extended or adjusted under 35 U.S.C. 154(b) by 806 days.

(21) Appl. No.: 16/649,718

(22) PCT Filed: Sep. 28, 2018

(86) PCT No.: PCT/EP2018/076512
§ 371 (c)(1),
(2) Date: Mar. 23, 2020

(87) PCT Pub. No.: WO2019/063816
PCT Pub. Date: Apr. 4, 2019

(65) Prior Publication Data
US 2020/0254607 A1 Aug. 13, 2020

(30) Foreign Application Priority Data

Sep. 29, 2017 (DK) .............................. PA201700536
Jan. 16, 2018 (DK) .............................. PA201800028

(51) Int. Cl.
*B25J 9/12* (2006.01)
*B25J 9/00* (2006.01)
(Continued)

(52) U.S. Cl.
CPC .............. *B25J 9/0009* (2013.01); *B25J 9/12* (2013.01); *B25J 11/008* (2013.01); *B25J 5/007* (2013.01)

(58) Field of Classification Search
CPC . B25J 9/162; B25J 5/007; B25J 9/0009; B25J 9/123; B25J 11/0085; B25J 11/0095
See application file for complete search history.

(56) References Cited

U.S. PATENT DOCUMENTS

2006/0149419 A1\* 7/2006 Ogawa ..................... B25J 5/007
700/245
2010/0312390 A1 12/2010 Dupourque
(Continued)

FOREIGN PATENT DOCUMENTS

| CN | 106695848 | 5/2017 |
| DE | 10 2011 110 196 | 2/2013 |
| WO | WO 2015/085985 A2 | 6/2015 |

OTHER PUBLICATIONS

International Search Report and Written Opinion of the ISA for PCT/EP2018/076512, dated Jan. 7, 2019, 13 pages.

*Primary Examiner* — Randell J Krug
(74) *Attorney, Agent, or Firm* — Nixon & Vanderhye P.C.

(57) ABSTRACT

A module (200) for connecting a mobile robot (110) to associated equipment (400) is provided, as well as to a device (700, 800) for connecting equipment to a docking station (900, 1000). The module (200) has a housing (210) defining the exterior of said module (200). The module (200) comprises a plurality of locking members (220a, 220b, 220c, 220d) each being moveable between an idle position, in which the locking member (220a, 220b, 220c, 220d) is arranged fully within said housing (210), and a projecting position, in which at least a part of the locking member (220a, 220b, 220c, 220d) is extending outside the housing (210).

15 Claims, 14 Drawing Sheets

(51) Int. Cl.
   *B25J 11/00* (2006.01)
   *B25J 5/00* (2006.01)

(56) References Cited

U.S. PATENT DOCUMENTS

| | | |
|---|---|---|
| 2011/0015779 A1 | 1/2011 | D'Andrea et al. |
| 2016/0288687 A1 | 10/2016 | Scherle et al. |
| 2017/0129705 A1* | 5/2017 | Luc .......................... B07C 3/02 |
| 2018/0178375 A1* | 6/2018 | Yang ....................... B25J 19/00 |

* cited by examiner

SYSTEM FOR CONNECTING AN AUTONOMOUS MOBILE ROBOT

This application is the U.S. national phase of International Application No. PCT/EP2018/076512 filed 28 Sep. 2018, which designated the U.S. and claims priority to DK Patent Application No. PA201700536 filed 29 Sep. 2017, and DK Patent Application No. PA201800028 filed 16 Jan. 2018, the entire contents of each of which are hereby incorporated by reference.

TECHNICAL FIELD

The present invention relates to a system and devices for connecting an autonomous mobile robot and equipment associated thereof. In particular, the present invention relates to connecting a transport robot to surrounding equipment, such as to carts, and to selectively connecting the equipment (such as the cart) to the transport robot or to a docking station.

BACKGROUND

Mobile autonomous robots are used widely in industrial applications, especially for logistics and transport of goods. A typical scenario for such robots is to pick up goods at a first position, and to deliver the goods at a second position. The first and second positions are pre-programmed, and no humans are therefore needed to perform the transportation.

The goods are normally arranged on carts, which are passive equipment. The robot must therefore connect to the cart in order to be able to drive the goods, while disconnecting is required when the robot reaches the delivery position.

US2017/0129705 describes a logistics center where nesting-type racks, lift trolleys, and shuttle robot carts are used to move parcels from an unloading point to a stowage zone. The shuttle robot cart has arms which are extensible laterally. On the underside of each arm, a magnet is provided which is to engage with a corresponding magnet on a horizontal bar of a rack in order to lock the rack to the shuttle robot cart. The arms can be extended to different lengths depending on the width of the associated rack, such that a single shuttle robot cart can be used with different racks.

Although the extensible arms provide versatility, they occupy a significant amount of space. Further, each arm must be controlled individually to ensure activation and deactivation of the respective magnets.

In view of this, there is a need for improvements in connecting autonomous mobile robots to surrounding equipment.

SUMMARY

It is thus an object of the teachings herein to provide an improved system for connecting a mobile robot to associated equipment, as well as to systems for connecting equipment to stationary stations.

According to a first aspect, a module for connecting a mobile robot to associated equipment is provided. The module has a housing defining the exterior of said module, and the module comprises a plurality of locking members each being moveable between an idle position, in which the locking member is arranged fully within said housing, and a projecting position, in which at least a part of the locking member is extending outside the housing.

In an embodiment, each locking member is movable in a horizontal plane. Such movement may e.g. be accomplished by a purely horizontal motion, or by a rotational motion around a rotational axis being arranged in the horizontal plane. In such embodiment, the locking member may e.g. move from a vertically aligned position to a horizontally aligned position.

The module may comprise a first pair of locking members being arranged to project out from a first side of the housing, and a second pair of locking members being arranged to project out from a second, opposite, side of the housing.

The module may comprise a bottom part and an upper part, said bottom part being configured to be securely attached to an upper end of the mobile robot, and wherein said locking members are arranged in the upper part of said module.

The bottom part of the module may further comprise a lifting device being configured to move the upper part relative the bottom part in the vertical direction.

The lifting device may comprise at least one wedge-shaped member in cooperation with a moving member, such that vertical motion is accomplished by relative horizontal movement between the wedge-shaped member and the moving member.

The housing may have a rectangular shape, and a lifting device may be positioned in each corner of the housing.

At least one locking member may form an actuator for a locking device of an associated equipment.

According to a second aspect, a locking member module to be used with a top module for connecting a mobile robot to associated equipment, is provided. The locking member module comprises at least one locking member and a drive means connected thereto, such that at least one locking member is moveable between an idle position, in which the locking member is arranged fully within a housing of the top module, and a projecting position, in which at least a part of the locking member is extending outside the housing.

The entire locking member module may be provided as a stand-alone unit to be mounted to a top module.

According to a third aspect, a locking device to be arranged on equipment being configured to be transported by an autonomous mobile robot, is provided. The locking device is maneuverable between a first mode and a second mode in order to enable selective locking of the associated equipment to the robot and to a docking station.

Maneuvering between the first and second mode may be effected by means of an external actuator.

Insertion of the external actuator into the locking device may effect automatic change from the first mode to the second mode.

Removal of the external actuator from the locking device may effect automatic change from the second mode to the first mode.

The locking device may comprise a first engagement area for receiving a locking member of the mobile robot, and a second engagement area for receiving a locking member of the docking station.

The locking member of the top module may form the external actuator.

The locking device may further comprise a lever arm being spring biased to urge the locking device in the first mode.

The lever arm may have a first end being provided with a hook to engage with the locking member of the docking station.

The hook may extend from the lever arm at an angle, and the locking force may depend on the size of the angle, as well as on the spring biasing force.

According to a fourth aspect, a cart is provided. The cart comprises at least one locking device according to the third aspect.

The cart may comprise a front end and a rear end, wherein at least one of the front end and rear end comprises two spaced-apart locking devices.

A second engagement area of the locking device, for receiving a locking member of the docking station, may be arranged at the front end or at the rear end.

According to a fifth aspect, a docking station for use with a cart according to the fourth aspect, is provided. The docking station comprises at least one locking member for engagement with a locking device of the associated cart.

The locking member may be a protruding member extending in a horizontal direction, and the protruding member may have a groove being dimensioned to receive a hook of the locking device.

According to a sixth aspect, an autonomous mobile robot is provided, comprising a module according to the first aspect.

In an embodiment, the module is integrated with the robot.

According to a seventh aspect, a system is provided. The system comprises a mobile robot according to the sixth aspect, a docking station according to the fifth aspect, and a cart according to the fourth aspect.

According to an aspect, the invention relates to locking of a module that is mounted to a cart, such that there is a possibility to either secure locking between the cart and a mobile robot, or between the cart and a stationary "docking station".

Mobile robots are already widely used for logistic tasks in industry. For this application, focus is to provide a locking module design which ensures that a cart is not arranged in "temporary" places in production. The object is therefore to ensure that a cart, for transporting e.g. goods or articles, always has a firm connection with a mobile robot or a "docking station".

A "docking station" is a unit that ensures a desired position of the cart (in relation to a given position or a given system) being desired with respect to the articles or other objects to be transported by means of the carts. Examples include an assembly line having articles to be transported to a storage area, or a sorting area where articles are sorted and thereafter transported, by means of the cart, to a bigger container or the like.

One or more locking modules, ensuring a firm connection between a cart and a mobile robot, or between a cart and a docking station, is provided. The locking module has two positions, of which the initial position secures locking to a docking station, while an activated position secures locking/engagement with a mobile robot.

An external actuator may urge the locking module to change from the initial position to the activated position. When the actuator has brought the locking module to the activated position the actuator/locking house has a locking functionality between the cart and the mobile robot, from where the actuator is operated (either as a part of the robot or as a specific device mounted on the robot).

The locking module that ensures locking to the docking station, may be dimensioned such that the locking force can vary depending on the angle of the lock engagement area, as well as by varying the spring force acting to bring the locking module to its locking position.

The locking rate to the docking station may vary depending on dimensions and spring force, which ensures for the possibility to allow for full locking (self-retaining mechanism) between a cart and the docking station, and a possibility for a system which can be manually overridden and thereby unlock the cart by pulling the cart out from the docking station.

According to an aspect, the invention relates to a top module for connecting mobile robots to carts, racks, etc.

Mobile robots are already widely used for logistic tasks in industry. For this application, focus is to provide a top module design which when used ensures safety to the users and to the people in the area of the robots.

It is further important that the top module is compact with regards to the fact that the centre of gravity is preferably as low as possible.

The term "top module" includes a module being firmly attached to, or part of, the upper side of a mobile robot. This top module can in turn be used to connect a mobile robot, being capable of travelling from A to B, with carts, racks, and similar equipment to which goods are placed and which goods are intended to be transported from A to B.

The primary functionality of the top module is thus to be a part of the robot when it moves to e.g. location A to pick up a cart, to connect the robot with the cart, to thereafter move to location B to deliver the cart.

In order to ensure firm connection the top module is provided with four horizontally acting locking pins. When these are pushed into the top module the cart is disconnected from the robot; when they protrude out from the top module the cart is connected to the robot.

If it is desired to move a rack the top module may be provided with a lifting mechanism. When the four locking pins are protruding and thereby connected to the rack the lifting device can be activated, whereby the rack can be lifted and the robot can transport the rack from location A to location B.

The lifting mechanism is constructed such that two wedges are pulled towards each other when the mechanism is lifting, which provides for an optimum force transfer, whereby the friction forces between the upper and bottom part of the top module are kept at their minimum.

A top module for connecting a mobile robot to equipment such as carts, racks, etc. is provided. The top module comprises 2-4 horizontally acting locking pins which can be projected out from the module, and thereby fixate associated equipment.

The top module may have an upper section and a bottom section, wherein the 2-4 horizontally acting locking pins are arranged on the upper section, and wherein the bottom section is provided with a lifting mechanism which is configured to raise the upper section, such that the connected equipment can be lifted.

The lifting mechanism can be formed such that there are four load areas. The load areas are formed such that when they are separated they have a wedge shape, which when pressed against each other, will transform a horizontal movement to a vertical movement.

BRIEF DESCRIPTION OF THE DRAWINGS

Embodiments of the teachings herein will be described in further detail in the following with reference to the accompanying drawings which illustrate non-limiting examples on how the embodiments can be reduced into practice and in which.

DETAILED DESCRIPTION

The following description is directed to a top module which is configured to be mounted to a mobile robot in order to provide improved functionality of the mobile robot, as well as auxiliary equipment such as carts, racks, locking devices, and docking stations.

It should be mentioned that the improved concept is by no means limited to the embodiments described herein, and several modifications are feasible without departing from the scope of the appended claims.

The number of repetitive and/or predictable tasks performed within e.g. a production or logistic flow are numerous. Many of these tasks can be partly or fully automated. However, although the tasks may be repetitive and predictable, the flows need to be set up for flexibility and agility. This means that fixed installations on the robot for repetitive tasks may be considered a hindrance with regards to flexibility and agility. Many installations are using autonomous mobile robots 110 (see e.g. FIGS. 11-13) in order to keep their flow flexible and still reducing the number of repetitive and/or predictable tasks needed to be performed by humans. The autonomous mobile robots 110 are typically designed to perform transportation tasks such as transporting an item from one location to another.

Depending on the item to be transported, the autonomous mobile robot 110 may be arranged in various configurations and it may very well be that different types of autonomous mobile robots 110 are needed or that significant time is spent reconfiguring an autonomous mobile robot 110 when e.g. an item to be transported is changed.

In order to maximize flexibility and save in time and cost, a module 200 is introduced that also allows different equipment 400 to be used with the same autonomous mobile robot 110.

Figure 1A:
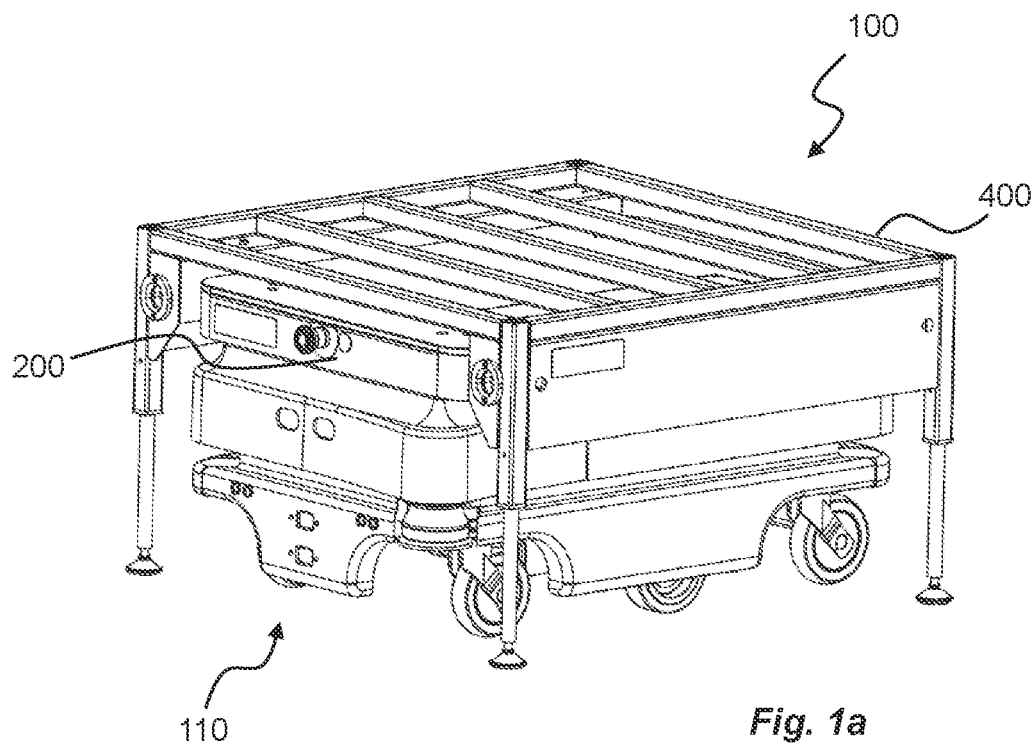
FIG. 1a is an isometric view of a system having a mobile robot, a top module, and equipment in the form of a rack, according to an embodiment.

With reference to FIG. 1a, one embodiment is shown wherein a module 200 is arranged on top of a mobile robot 110 in order to connect the mobile robot 110 to different associated equipment 400. The module 200 is provided as a separate part, i.e. it is pre-manufactured and later mounted/connected to the robot 110. It should be mentioned that the module 200 could in some embodiments instead be integrated with the robot 110, i.e. the module 200 forms part of the robot 110.

In FIG. 1a, the associated equipment is a rack 400. The module 200, thus forming a top module 200, is securely fixed to the mobile robot 110 and the connection between the module 200 and the rack 400 is achieved e.g. by means of a locking device 700 of the rack 400 which will be explained in more detail in later sections.

Figure 1B:
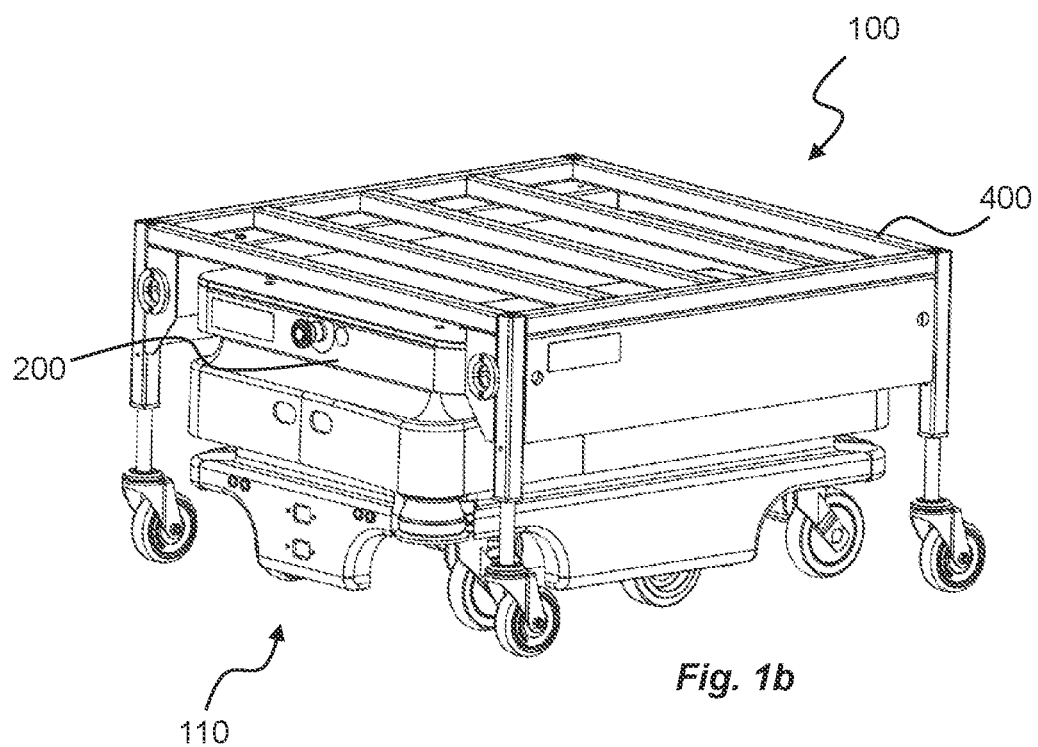
FIG. 1b is an isometric view of a system having a mobile robot, a top module, and equipment in the form of a cart, according to an embodiment.

In FIG. 1b, the module 200 is instead connected to a cart 400, in a manner as will also be described in the following.

With the assistance of FIG. 2 and FIG. 3, the module 200 will be explained in further detail. The module comprises a housing 210, a plurality of locking members 220a, 220b, 220c, 220d, a bottom side mb, an upper side mu a first side s1 and a second side s2. Due to the rectangular shape of the module 200 two additional sides are also provided, although not described further herein.

Figure 3A:
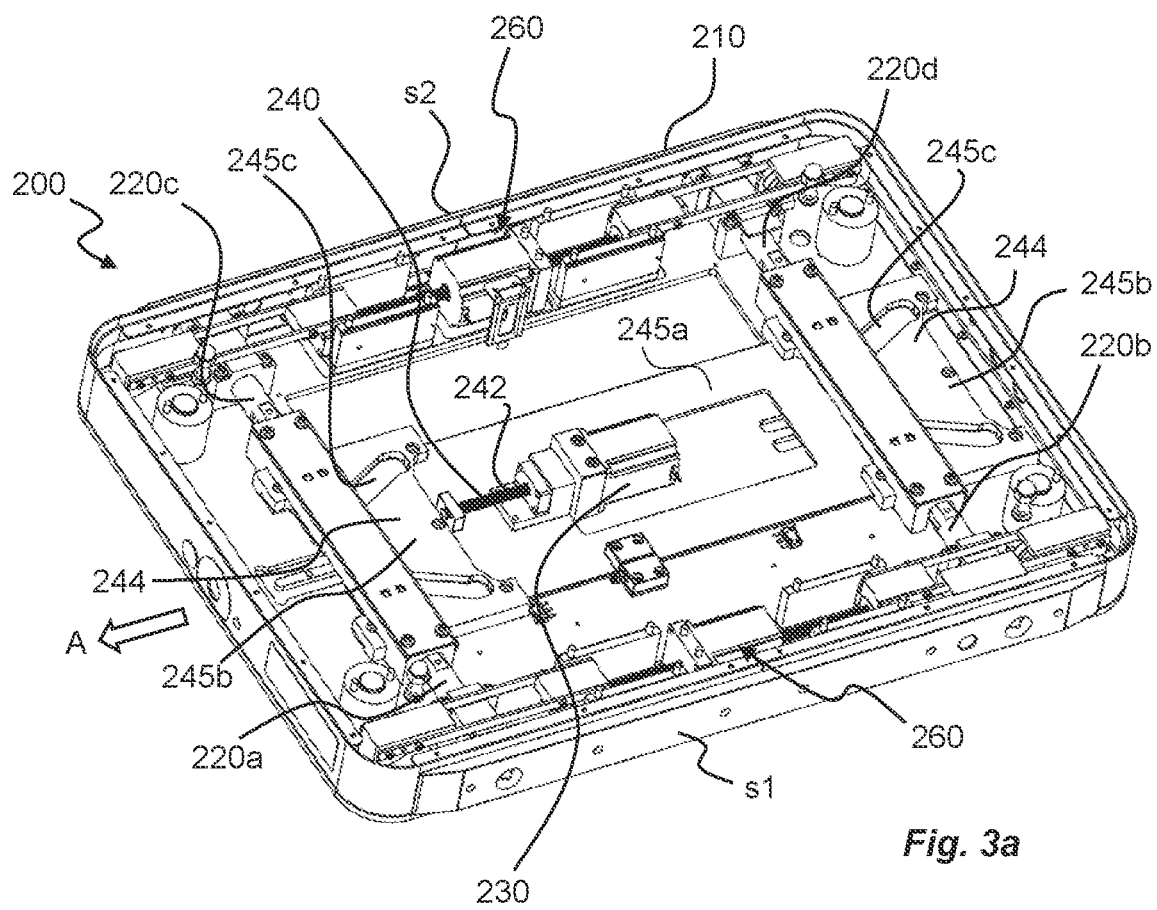
FIG. 3a is an isometric view of the top module shown in FIG. 2, showing the interior.

FIG. 3a is a view of the module 200 with the lower side mb removed showing how the locking members 220a, 220b, 220c, 220d extend in a horizontal plane inside the housing 210 of the module 200. Each of the locking members 220a, 220b, 220c, 220d is movable in a the horizontal direction such that they can either be in an idle state substantially inside the housing 210 or in a projected position wherein at least part of the locking member 220a, 220b, 220c, 220d is extending outside the housing 210. The module 200 may be arranged such that the position of each locking member 220a, 220b, 220c, 220d is controlled individually, but preferably the locking members 220a-d are controlled in a synchronized manner by a common electrical motor 230 and a transmission 240 coupled thereto.

In the shown example, the motor 230 is centrally arranged between the locking members 220a-d and a threaded rod 242 extends from one longitudinal end of the motor 230. The threaded rod 242 (only one being visible in FIG. 3a) drives a cam plate 244 to control the position of the respective locking members 220a-d.

In another embodiment, a threaded rod extends from each longitudinal end of the motor 230, and each threaded rod is driving a thereto connected cam plate. Hence, in such embodiment there are two cam plates, not connected to each other but in synchronized drive due to the common electrical motor. In a yet further embodiment, two linear motors (not shown) are provided, each linear motor is driving a cam plate for moving a pair of locking members 220a-d.

In the shown example, the cam plate 244 has an intermediate portion 245a, and two opposite end portions 245b. V-shaped grooves 245c form part of the cam plate 244, and are connected by the intermediate portion 245a. Each groove 245c receives a guiding member (not shown) of the locking members 220a-d. When the electric motor 230 is activated, the cam plates 244 will move in the direction A indicated by block arrow in FIG. 3a. Due to the shape of the V-shaped groove 245c, the locking members 220a-d will be urged to move in a direction perpendicular to the direction A, i.e. out from the housing 210. In- and outward motion of the locking members 220a-d is thereby accomplished by driving the electric motor 230 in opposite directions.

The locking members 220a, 220b, 220c, 220d are arranged such that a first pair of locking members 220a, 220b are arranged to project out from the first side s1 of the housing 210 and a second pair of locking members 220c, 220d are arranged to project out from the second side s2 of the housing. The module 200 may typically be arranged on top of the mobile robot 110 such that the bottom side mb of the module 200 is resting on the top side of the mobile robot 110.

Figure 2:
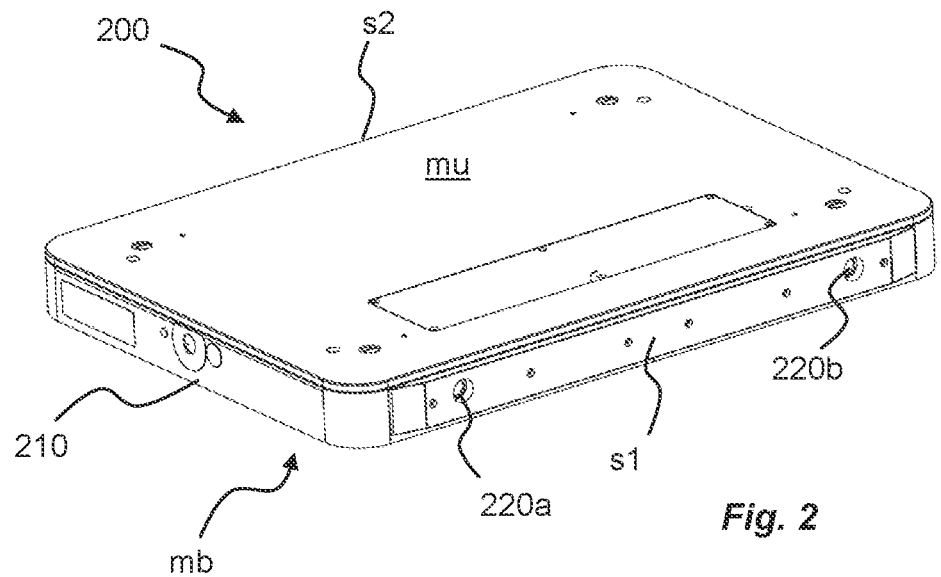
FIG. 2 is an isometric view of a top module according to an embodiment.
Figure 3B:
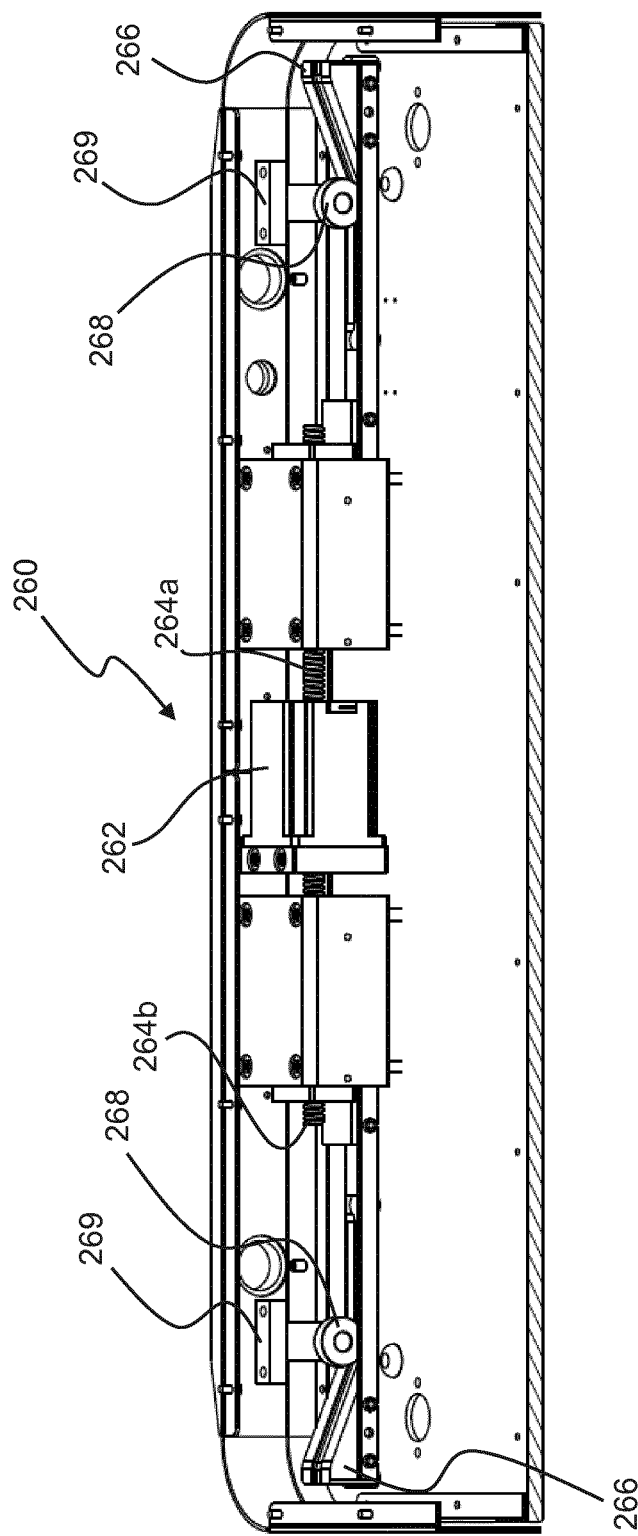
FIG. 3b is an isometric view showing details of a lifting device, forming part of a top module according to an embodiment.

The module 200 shown in FIG. 2 and FIGS. 3a-b is but one example of how a module may be arranged, the skilled person will understand that the number of locking members 220 may be varied as well as the configuration of the same. Further to this, the module 200 as seen in FIG. 2 and FIGS. 3a-b is formed in a substantially rectangular form, it should be understood that the form may be any suitable form ranging from e.g. an oval or circular form to a form comprising any number of corners.

The locking members 220a, 220b, 220c, 220d may be driven by the motor 230 acting as driving means (not shown), and controlled by a controller (not shown). The driving means may not necessarily be a motor 230, but it may be any means suitable of actuating the movement of a locking member 220a, 220b, 220c, 220d from the idle position to the projected position and vice versa. Such a driving means may be e.g. one or more step motors, rod-type actuator, pneumatic actuators, solenoids, spring mechanism, etc. The arrangement may be such that all locking members 220a, 220b, 220c, 220d are driven by the same driving means or in any other configuration. The control of the driving means may be achieved by a controller internal to the module 200; the controller may be a PLC or any other programmed logic being configured to transmit control signals to the electric motor 230 of the top module. More specifically, the controller is configured to communicate with the mobile robot 110, such that the controller may receive position data, trigger data, or other signals/data required to control activation of the locking members 220a-d of the top module 200

In another embodiment, the controller forms part of the mobile robot 110 whereby communication between the controller and the driving means is established through a suitable interface. Such interface may be wired, wire-less, etc., and a similar communication interface may be provided also for the embodiment in which the controller forms part of the module 200.

Preferably, the module 200 is also provided with cables for receiving power from the mobile robot 110. This is particularly advantageous if also the controller is arranged within the mobile robot 110, whereby both power and control signals could be received by the module 200 from the mobile robot 110. However, it is also possible to provide the module 200 with a dedicated power supply in order to drive the locking members 220a-d.

In a further embodiment, the module 200 is provided with a lifting device 260 allowing the upper part mu to be moved relative to the bottom part mb in a vertical direction. In a typical arrangement of the module 200 on top of a mobile robot 110 this would allow an associated equipment 400 to be lifted and lowered in relation to the mobile robot 110. In a module 200 of a substantially rectangular shape such as the one shown in FIG. 2 and FIG. 3a, it may be preferable to place one lifting device at each corner of the module 200 in order to allow a stable and controlled lifting movement.

In FIG. 3b details of a lifting device 260 are shown in further details. The lifting device 260 is arranged on one side s1, s2, meaning that typically two lifting devices 260 are required for a rectangular module 200.

Each lifting device 260 comprises an electrical motor 262 which is driving two threaded rods 264a-b, each rod 264a-b extending from opposite longitudinal ends of the electrical motor 260. Each rod 264a-b is at its opposite end connected to a tapered member 266, whereby activation of the motor 262 will cause a longitudinal movement of the tapered member 266. The tapered member 266 is engaged with a roller 268, which in turn is supported by a bracket 269 to which the upper part mu is attached. Hence, when the electrical motor 262 is activated, the tapered members 266 will move towards the electrical motor 262, thus urging the rollers 268 to move vertically upwards because of the slope of the tapered members 266. Since the upper part mu of the housing 210 is connected to the wheel 268 via the bracket 269, the upper part mu will raise upwards. This is particularly advantageous when transporting a rack 400 as shown in FIG. 1a, but also for situations depicted in e.g. FIGS. 11-13 (even with the cart shown in FIGS. 11a-c).

It should be mentioned that even if the locking members 220a-d have been described as forming part of the top module 200, in some embodiments the top module 200 is provided as a separate part without any locking members 220a-d, which instead are added to the top module 200 by forming part of one or more locking member modules. Typically, such locking member module comprises one or more locking members 220a-d, and a drive means (such as a motor 230) connected thereto, The locking member module is preferably configured such that when it is mounted to a top module 200, the at least one locking member 220a-d is moveable between an idle position, in which the locking member 220a-d is arranged fully within a housing 210 of the top module 200, and a projecting position, in which at least a part of the locking member 220a-d is extending outside the housing 210.

Figure 9:
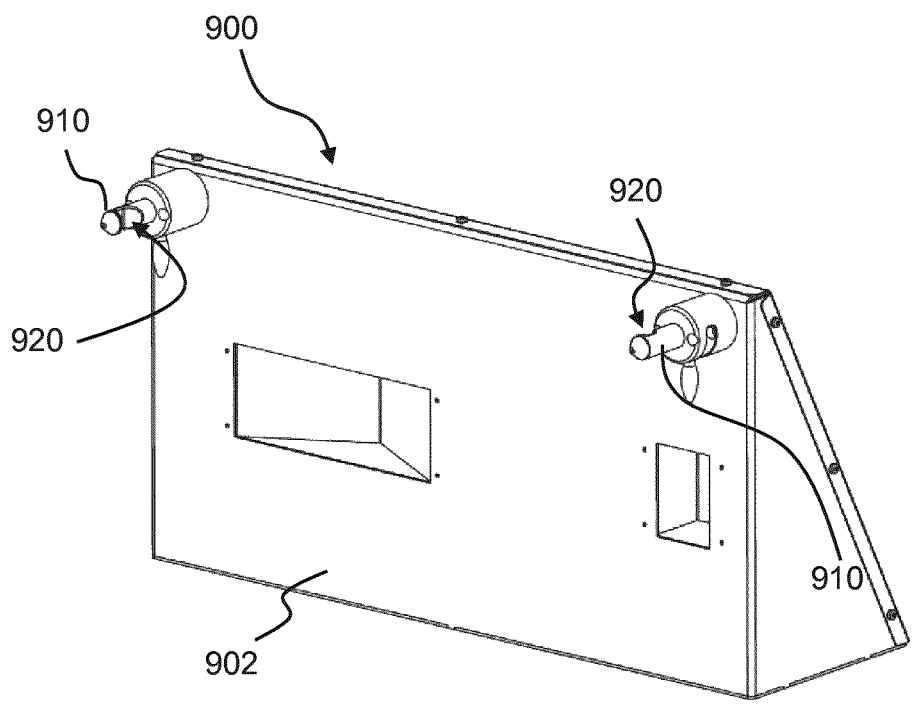
FIG. 9 is an isometric view of a docking station for use with the locking device shown in FIGS. 7a-g.
Figure 10:
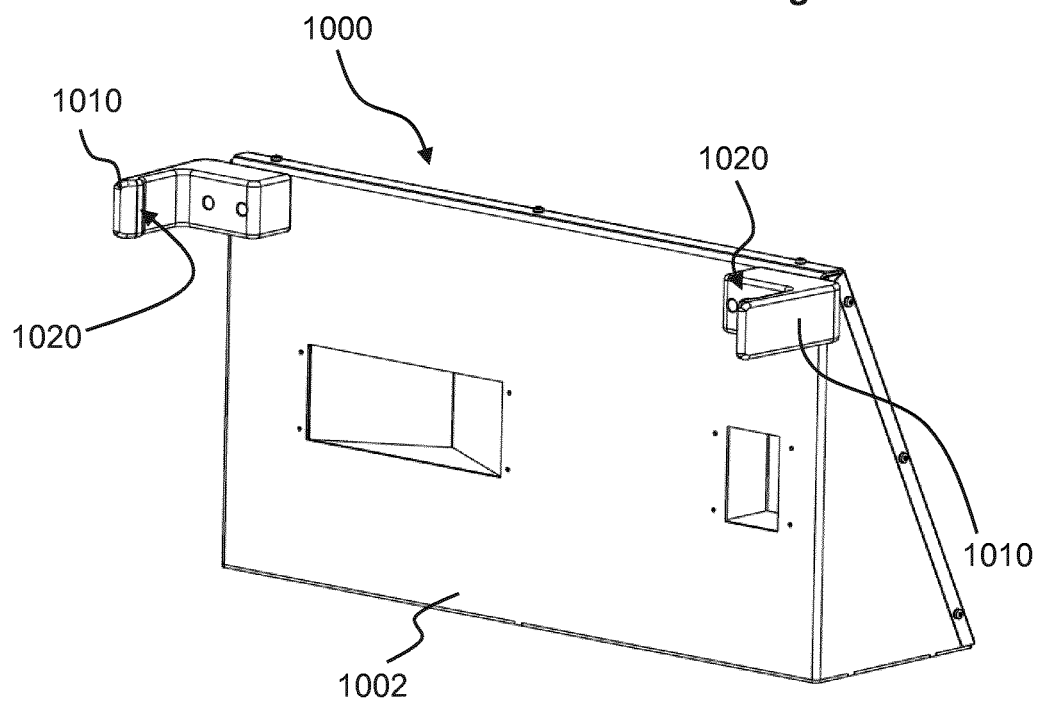
FIG. 10 is an isometric view of a docking station for use with the locking device shown in FIG. 8.

Now turning to FIGS. 4a-b, 5a-b and 6a-b, embodiments of an associated equipment 400 is shown. In these FIGS. 4-6, the associated equipment is shown as a cart 400 and although this is the preferred embodiment, many other shapes or forms of the associated equipment are possible, such as racks etc. The associated equipment 400 is provided with a locking device 700, 800 in order to allow the equipment 400 to be secured to a module 200 of a mobile robot 110, or to a docking station as is shown in FIGS. 9-10.

When referring to "docking stations", such structure should be interpreted broadly to cover all fixed installations which would be suitable to define a stationary position of equipment being otherwise transported by mobile robots. For example, the equipment could be a cart having a flat top being provided with a conveyor belt, which is designed to form part of a manufacturing site (or other logistic industry). In order to ensure the correct position of the conveyor belt, the cart could be connected to an adjacent structure forming a working station, such as a station having a conveyor belt receiving goods from the conveyor belt of the cart. Docking station/working station could thus be used interchangeably within this specification.

Figure 4A:
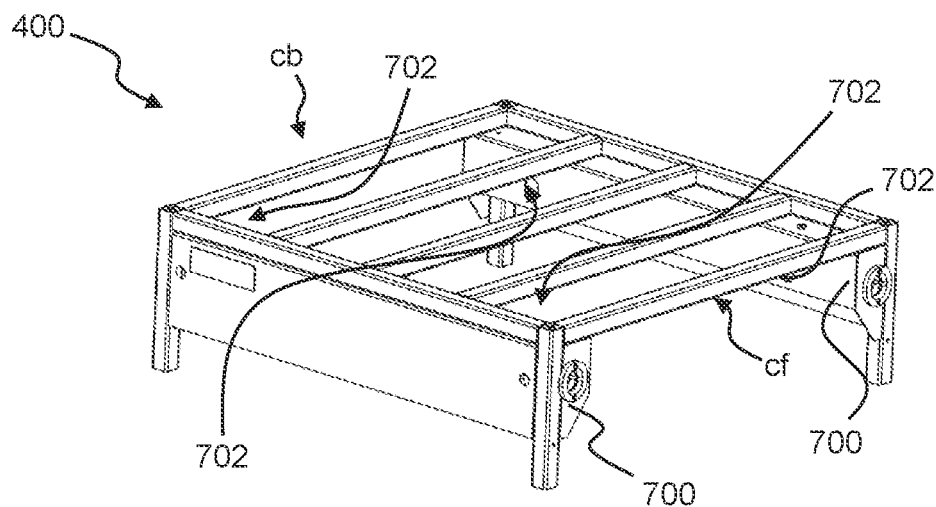
FIGS. 4a-b are isometric views of parts of carts, including different locking devices according to embodiments.
Figure 4B:
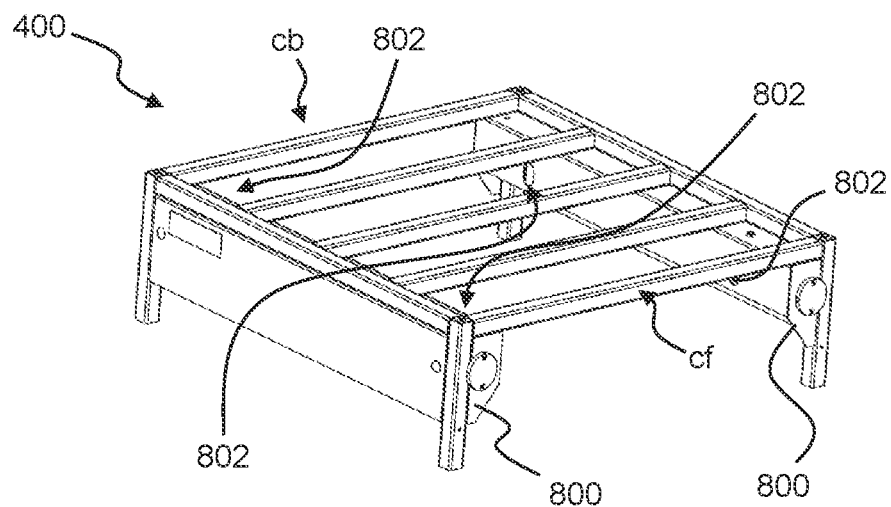
Figure 5A:
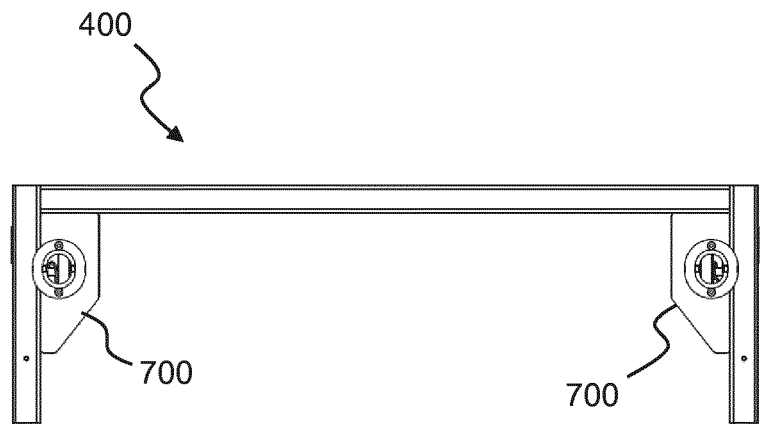
FIGS. 5a-b are front views of the carts shown in FIGS. 4a-b.
Figure 5B:
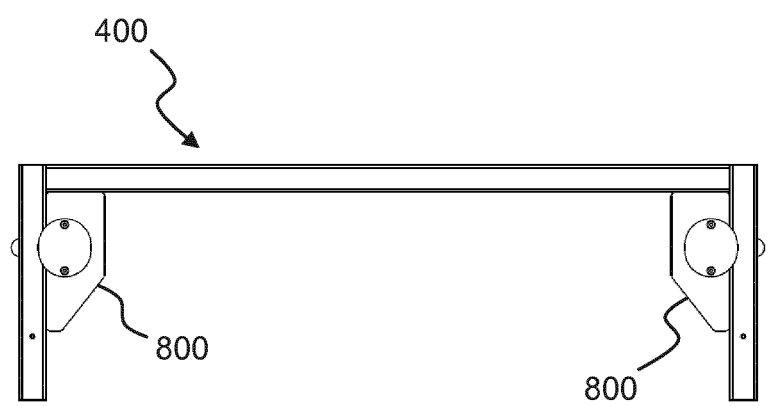
Figure 6A:
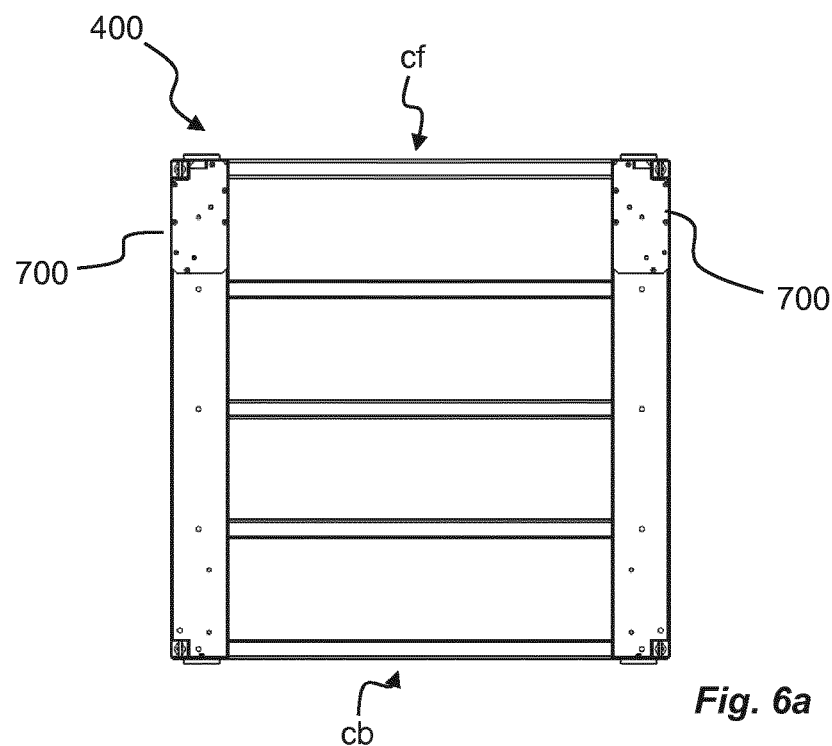
FIGS. 6a-b are top views of the carts shown in FIGS. 5a-b.
Figure 6B:
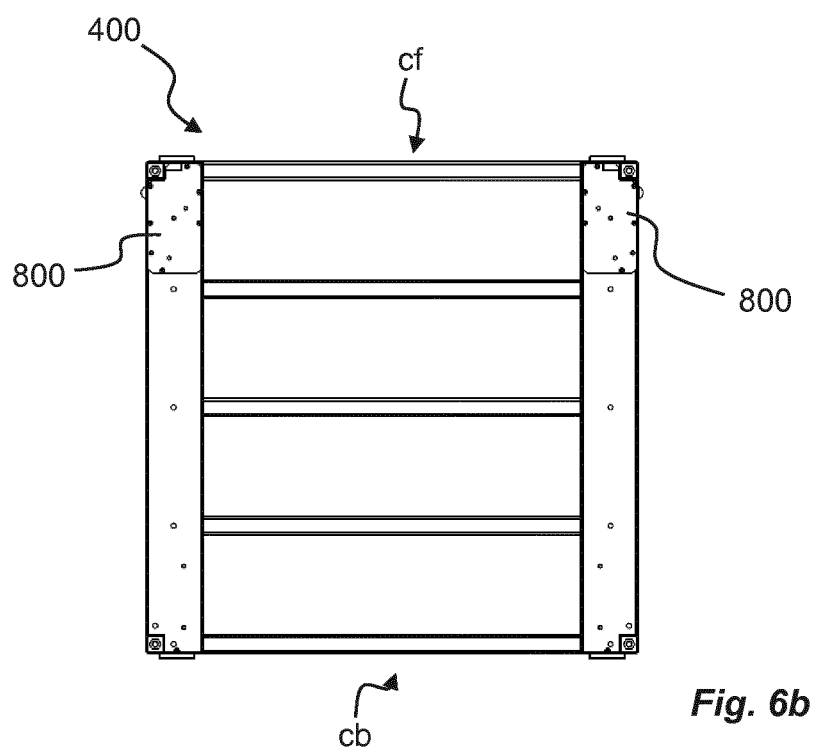

FIGS. 4a, 5a, and 6a show a cart 400 having locking devices 700 of a first embodiment (the locking device 700 being further described with reference to FIGS. 7a-c), while FIGS. 4b, 5b, and 6b show a cart 400 having locking devices 800 of a second embodiment (the locking device 800 being further described with reference to FIG. 8)

In its most simple form, the locking device 700 is one or more recesses 702 arranged on the inside of the equipment; the recesses 702 are dimensioned and spaced-apart such that each recess 702 is allowed to receive a locking member 220a-d of an associated module 200. The recesses 702 are preferably oblong in order to allow for variations in height between the equipment 400 and the mobile robot 110.

Hence, when the mobile robot 110 is positioned under the equipment 400, the locking members 220a-d are actuated such that they protrude out from the housing 210 of the module 200, and into mating recesses 702 of a locking device 700 of the equipment 400. The equipment 400 is thereby attached to the mobile robot 110, which will release the equipment 400 by again actuating the locking members 220a-d to an inward motion, away from the recesses 702.

Although showing only one recess 702 in FIGS. 4a-b, the respective position of the remaining three recesses 702 are indicated by arrows.

The locking devices 700, 800 also allow the equipment 400 to be secured to a docking station 900, 1000 (see FIGS. 9-10), or to a working station e.g. a stationary conveyor belt setup with a locking member 910, or similar. The equipment 400 is in such embodiments provided with two improved locking devices 700, 800 spaced-apart and facing a front side cf of the cart 400. Opposite the front side cf of the cart 400 is the rear side cb of the cart 400, which also may be provided with two improved locking device 700, 800. In any case, both the front side cf and the rear side cb is provided with two spaced apart locking devices 700 for securing the module 200 to the equipment 400, as has been described above.

Operation of a locking device 700 can in some embodiments allow for double functionality; in a first step, the locking device 700 secures the position of the equipment relative the docking/working station, while in a second step the locking device 700 also provides a pulling force, such that the locking device 700 (and the associated equipment) is pressed towards the docking/working station. This sequence is further depicted in FIGS. 7d-g.

Figure 7A:
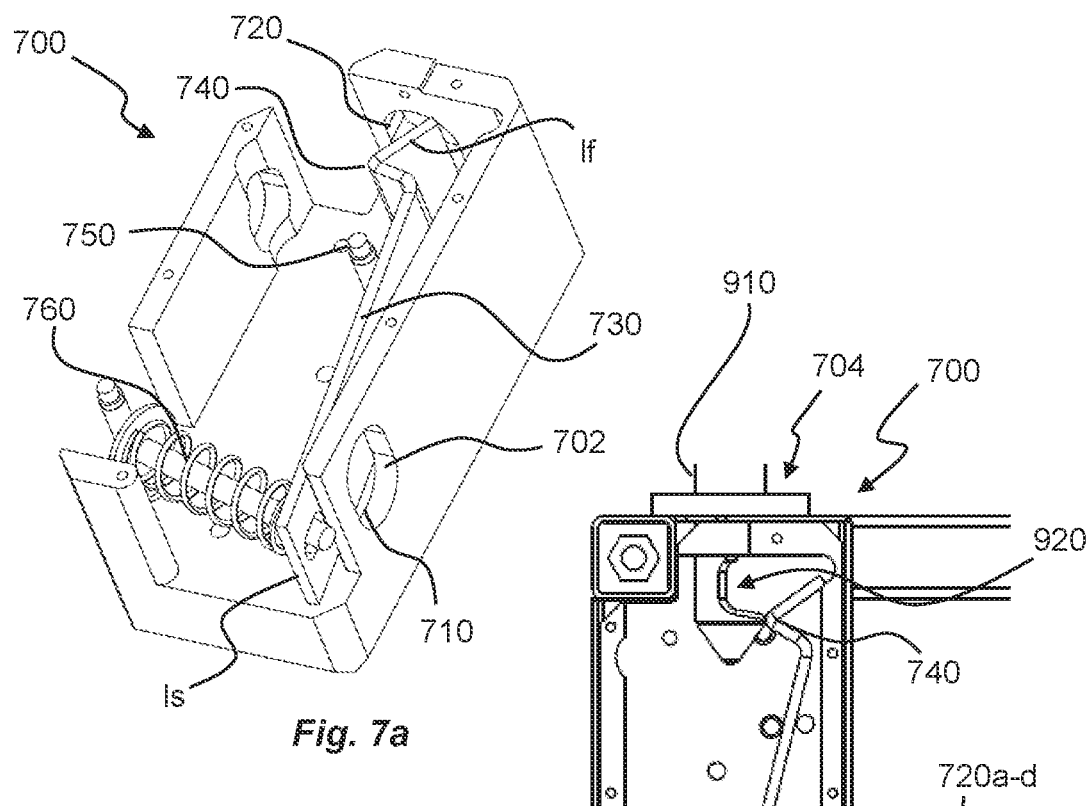
FIGS. 7a-c are detailed views, partly cross-sectional, of a locking device according to an embodiment.
Figure 7B:
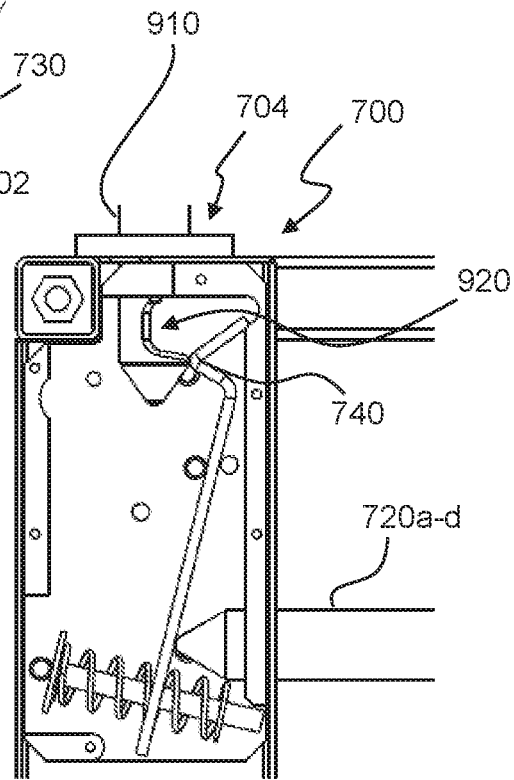
Figure 7C:
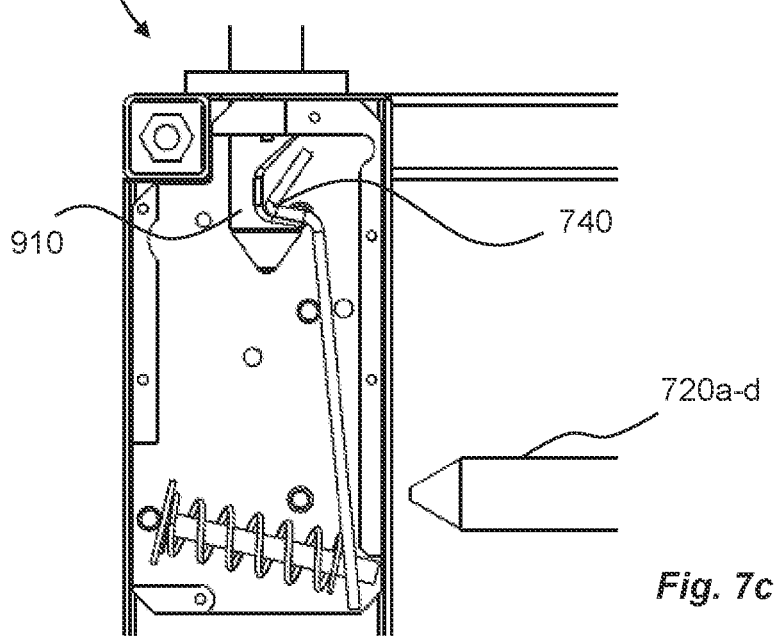

In FIG. 7a-c, one embodiment of the locking device 700 is shown. FIG. 7a shows the locking device in a first mode where no external stimuli is present in either a first engagement area 710 or a second engagement area 720. When the locking device 700 is arranged on an associated equipment 400 being operated by a mobile robot 110, the first engagement area 710 is facing either the first side s1 or the second side s2 of the module 200 arranged on the mobile robot 110. The arrangement is such that one of the locking members 220a, 220b, 220c, 220d is aligned with the first engagement area 710 such that when the locking member 220a, 220b, 220c, 220d is in its projected position, the locking member 220a, 220b, 220c, 220d will enter the first engagement area 710 through the recess 702. Arrange inside the locking device 700 is a lever arm 730 that comprises a first end 1f provided with a hook 740. The lever arm 730 is arranged such that a second end is of the lever arm 730 is proximal to the first engagement area 710 in a manner such that when e.g. the locking member 220a, 220b, 220c, 220d of an associated module is received within the engagement area 710, the locking member 220a, 220b, 220c, 220d interacts with the lever arm 730. The interaction causes the lever arm 730 to be pushed by the end of the locking member 220a-d, and to pivot around a pivot pin 750, which is part of the lever arm 730, such that the hook 740 at the first end 1f of the lever arm 730 is moved in the opposite direction of the force exerted by the locking member 220a, 220b, 220c, 220d on the lever arm 730. Further to this, the lever arm 730 may be biased by a spring 760 such that the lever arm 730 engages with the locking member of the docking/working station.

The second engagement area 720 is suitable to receive a locking member 910 of a docking station 900. The docking station 900 and its associated locking members 910 will be explained in further detail in later sections. For now, looking at FIG. 7b will reveal the locking device 700 in the second mode. The locking member 220a, 220b, 220c, 220d of the associated module 200 is engaging the lever arm 730 through the first engagement area 710 such that the lever arm 730 is moved in the opposite direction of the engagement force of the spring 760. The second engagement area 720 receives the locking member 910 of the docking station 900, allowing a groove of the locking member 910 to travel through a recess 704 of the second engagement area 720 and to freely pass the hook 740 of the lever arm 730.

It should be noted that it may be possible, in some embodiments, to allow the locking member 910 to travel from the second engagement area 720 and to pass the hook 740 of the lever arm 730 without having to use a locking member 220a, 220b, 220c, 220d of the module 200 to move the lever arm 730. This is achieved by shaping the first end 1f of the lever arm 730 such that when exerted by a force from the locking member 910 of the docking station 900, the spring 760 is compressed, the lever arm 730 moved and the locking member 910 of the docking station 900 is able to pass the hook 740 of the lever arm.

Now turning to FIG. 7c, the locking device 700 is again shown in the first mode. The groove 920 of the locking member 910 can be seen to be engaged by the hook 740 of the lever arm 730 such that the locking member 910 is fixed to the locking device 700. The locking member 220a, 220b, 220c, 220d of the module 200 is in its idle position. One effect of this arrangement is that when the mobile robot 110 moves away, including the module 200 comprising the locking members 220a, 220b, 220c, 220d being attached to the mobile robot 110, the locking device 700 will not move with the mobile robot 110 but stay in place through the attachment of the locking member 910 of the docking station 900. As mentioned, the locking device 700 may be attached to an associated equipment 400 such as a cart and this means that the associated equipment 400 would stay by the docking station 900 and the mobile robot 110 would be free to e.g. pick up another associated equipment 400.

The explanation above is given from a perspective of a mobile robot 110 leaving an associated equipment 400 at a docking station 900. The reverse scenario is of course also covered by this explanation, i.e. starting in the first mode, as shown in FIG. 7c, wherein the locking device 700, which may be connected to an associated equipment 400, is connected to the docking station 900. The locking member 220a, 220b, 220c, 220d of the module 200 will engage the first engagement area of the locking device 700 as shown in FIG. 7b, thus pushing the lever arm 730 and causing the lever arm 730 to pivot around the pivot pin 750. This moves the first end 1f of the lever arm 730 in the opposite direction of the pushing motion of the locking member 220a, 220b, 220c, 220d and the hook 740 of the lever arm 730 disengages from the groove 920 of the locking member 910 of the docking station 900.

Another embodiment of a locking device 700 is schematically shown in FIGS. 7d-g. As suggested earlier, this embodiment relates to a locking device 700 having double functionality, i.e. securing the position of the equipment 400 relative a docking station 900, as well as pulling the equipment 400 towards the docking station 900.

A cart 400, or other equipment, is provided with two locking devices 700 on each lateral side. Each locking device 700 has two spaced-apart engagement areas 710 for receiving a respective locking member 220a-d of a module 200 of a mobile robot 110. In FIGS. 7d-g, the major parts of the top module 200 are omitted for the sake of simplicity, thus showing only the locking members 220a-d.

A lever arm 730 is provided to engage with a locking member 910 of an associated docking/working station in the same manner as described above with reference to FIGS. 7a-c. This means that the lever arm 730 has one end if is provided with a hook 740.

The lever arm 730 is spring biased towards an idle position (shown in FIG. 7g) by means of two spaced-apart springs 760a-b. A first spring 760a is located in the area of the front-most engagement area 710 facing the docking station, and a second spring 760b is located in the area of the rear-most engagement area 710. The springs 760a-b have no connection to each other, but they can push the lever arm 730 independently of each other.

Figure 7D:
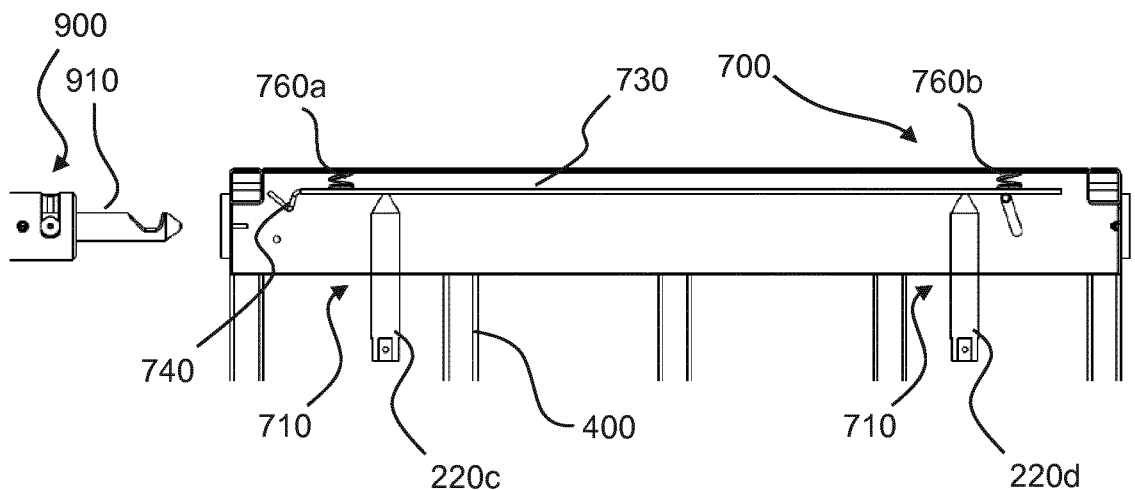
FIGS. 7d-g are cross-sectional views of a locking device according to an embodiment.
Figure 7E:
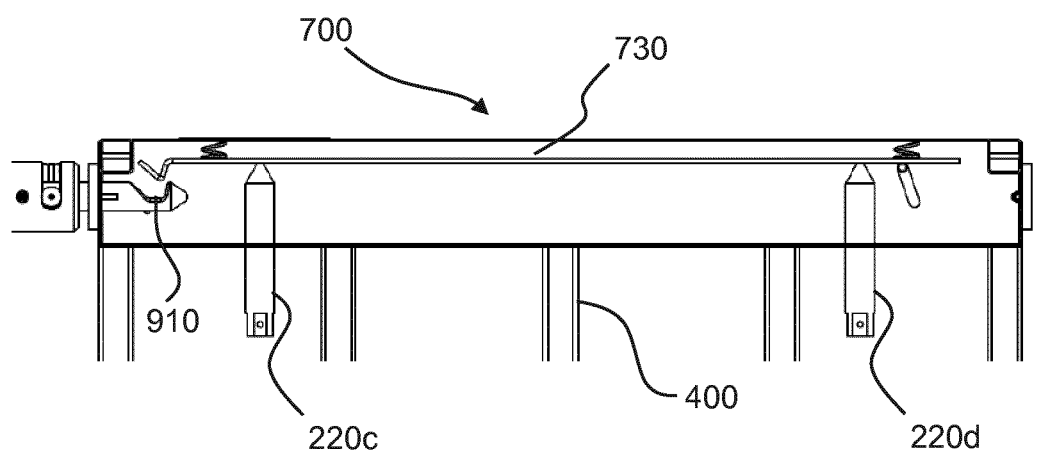

In FIG. 7d the equipment 400 is locked to the module 200, i.e. the locking members 220a-d are inserted into the engagement areas 710. In FIG. 7e, the equipment 400 is moved to engage with the locking members 910 of the docking station 900; i.e. each locking member 910 is received by the locking device 700 in the same manner as described above with respect to FIGS. 7a-c. As can be seen, the equipment 400 must not necessarily be entirely pushed against the docking station 900.

Figure 7F:
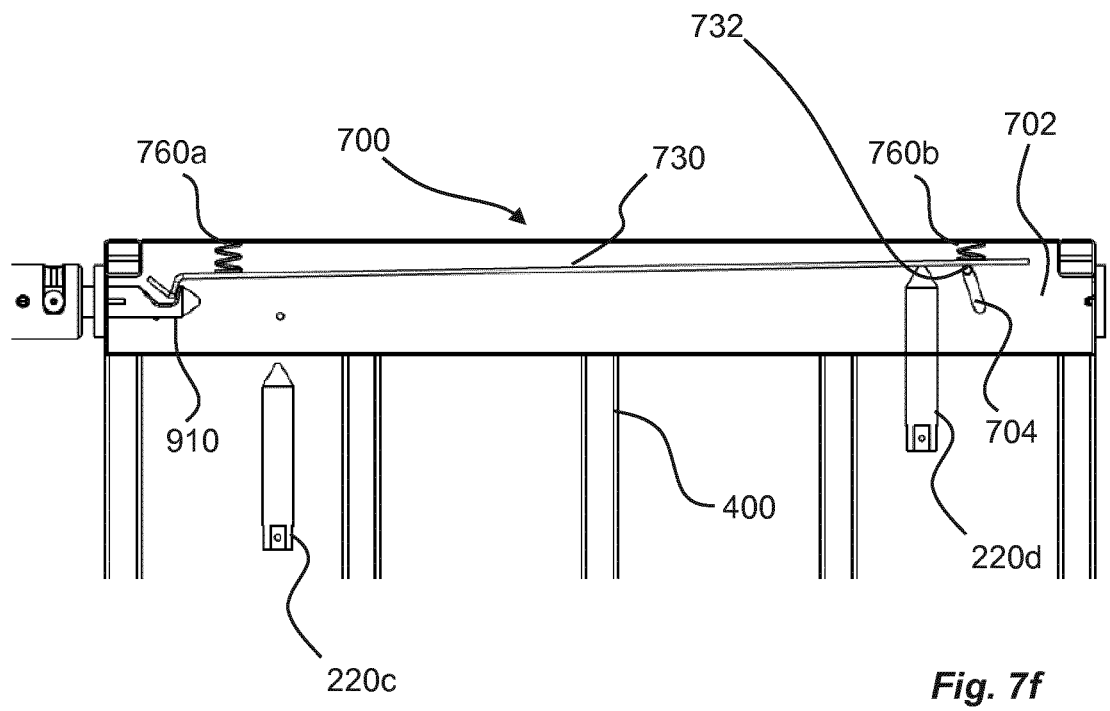

When the module 200 is to release the equipment 400, this is done in a two-step sequence. Initially, as indicated by FIG. 7f, the front-most locking member 220c of the module 200 is activated to be withdrawn from the locking device 700. The spring 760a will thereby urge the lever arm 730 to move, such that the hook 740 engages with the locking member 910 of the docking station 900.

Figure 7G:
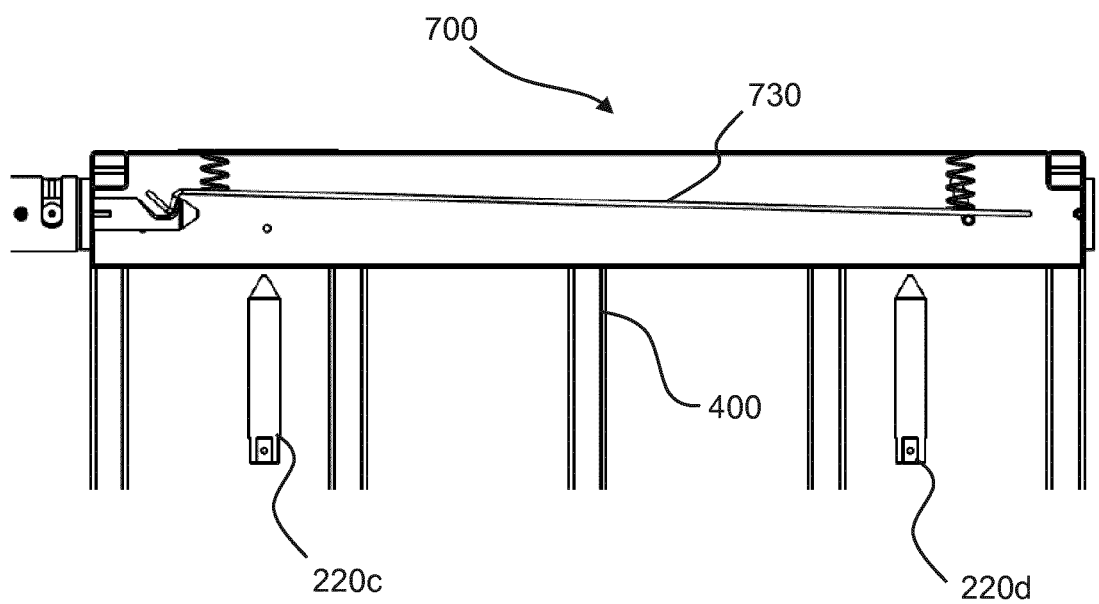

In a second step, the rear-most locking member 220d withdraws from the locking device 700, as indicated by FIG. 7g. The spring 760b will then urge the rear part of the lever arm 730 to move. This movement is however controlled by a connection between the lever arm 730 and a locking device housing 702. The lever arm 730 has a pin 732 being received in a tilted groove 704 of the housing 720, such that the lever arm 730, when moved towards the top module 200, also is urged to move rearwards. The effect will be a pulling action on the locking member 910 of the docking station 900, as the hook 740 prevents the lever arm 730 to move away from the locking member 910 of the docking station 900. The equipment 400 will thereby be automatically pulled towards the docking station 900.

Figure 8:
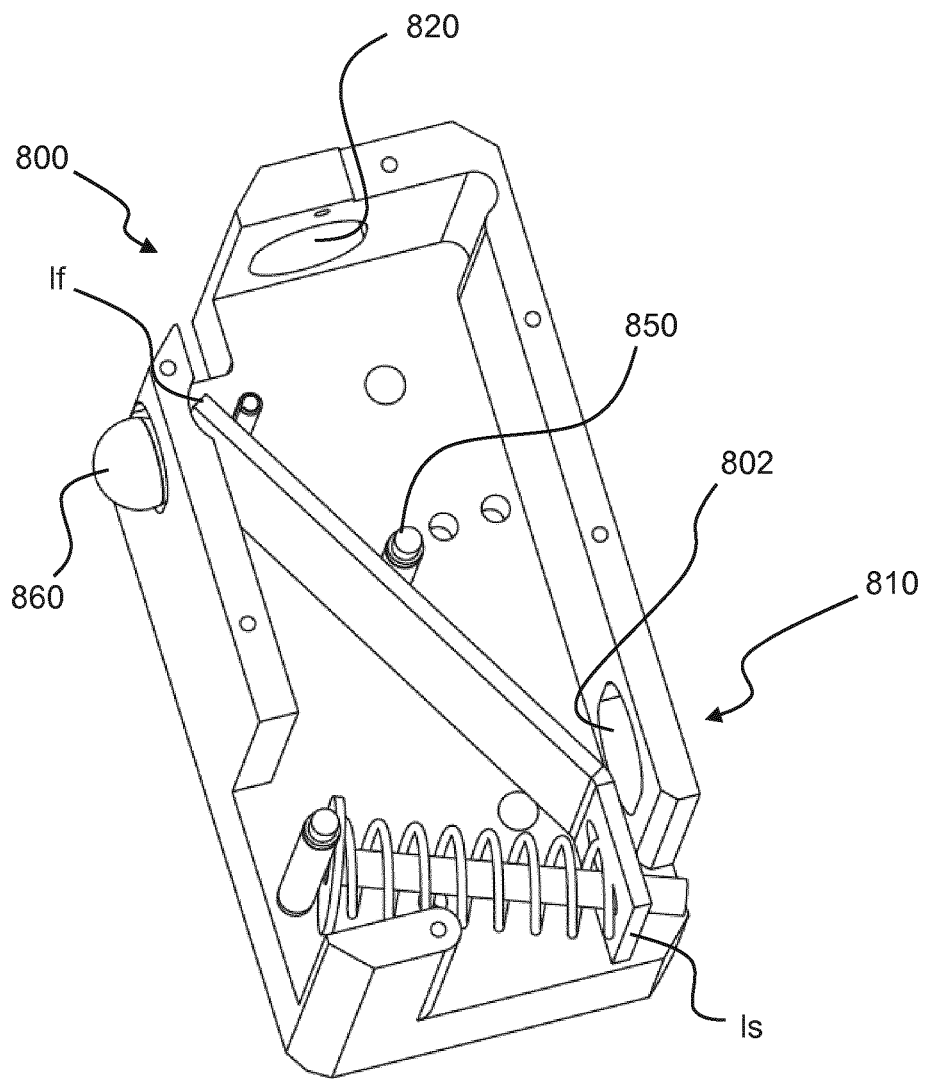
FIG. 8 is a cross-sectional view of a locking device according to another embodiment.

FIG. 8 depicts a slightly modified embodiment of a locking device 800 working from the same basic principle as the previously described embodiment of the locking device 700. The locking device 800 comprises a lever arm 830 engageable through a recess 802 of a first engagement area 810 by a locking member 220a, 220b, 220c, 220d of an associated module 200. The locking device 800 is maneuverable between a first mode and a second mode, in a manner being similar to the previously described embodiment. In FIG. 8 the first mode is shown, in which mode the locking device 800 is ready to receive a locking member 220a-d of a module 200. Once the locking member 220a-d is inserted into the recess 802 of the first engagement area 810, the locking device 800 will be in the second mode. In the second mode, the lever arm 830 is engaged by the locking member 220a, 220b, 220c, 220d of an associated module 200, i.e. the locking member 220a, 220b, 220c, 220d is in its projected position. Analogously to the previous embodiment, this causes the lever arm 830 to pivot around a pivot pin 850 and move a first end if of the pivot arm 830 in the direction opposite of the engagement movement of the locking member 220a, 220b, 220c, 220d. The locking device 800 is provided with a locking ball 860 arranged to, when pushed by the lever arm 830 due to the spring force acting in the is end, partly extrude from the locking device 800. Consequently, when the lever arm 830 is engaged by the locking member 220a, 220b, 220c, 220d the locking ball 860 is no longer urged outwards. The locking device 800 of this embodiment will thereby cause a change of the lateral dimensions of the top module 200; in the first mode, when no locking member 220a-d of the module 200 is engaging with locking device 800, the ball 260 will protrude laterally outwards by the spring 760. On the other hand, when the locking member 220a-d is inserted into the recess 802, the spring biasing force acting on the ball 860 will be released whereby the ball 860 may move inwards.

Hence, for both embodiments described above the locking member 220a-d of the module acts as an external actuator for the locking device 700, 800.

With reference to FIG. 9, one embodiment of a docking station 900 for use with equipment 400 being provided with locking devices 700 will be described. The docking station 900 is provided with two locking members 910 in the form of pins extending outwards from a support body 902. Each of the locking members 910 is provided with a groove 920 arranged such that when the locking member 910 is inserted into the second engagement area 720 of the locking device 700, the locking member 910 may be held inside the locking device 700 by the hook 740 of the lever arm 730 of the locking device 700. It should be mentioned that the particular design of the hook 740 of the lever arm 730, in combination with the configuration of the grove 920, can be designed in order to tailor the force required to manually override the action of the locking device 700. For example, a person should be allowed to pull the equipment away from the docking station 900, whereby the material of the lever arm 730 and/or the angles of the hook 740 could be adjusted to meet the specific requirements.

With reference to FIG. 10, one embodiment of a docking station 1000 for use with equipment 400 being provided with locking devices 800 will be described. The docking station 1000 is provided with two locking members 1010 in the form of lateral structures extending outwards from a support body 1002. Each of the locking members 1010 is provided with a depression 1020 arranged in the lateral direction outwards, and being arranged such that the ball 860 of the locking device 800 can pass freely into the area of the depression 1020 when the locking member 220a-d is causing the locking device 800 to be in the second mode. When the locking member 220a-d is released from the locking device 800, the ball 860 will be biased outwards into the depression 1020, thereby locking the equipment 400 to the docking station 1000. It should be mentioned that the particular design of the ball 860 and the spring biasing, in combination with the configuration of the depression 1020, can be designed in order to tailor the force required to manually override the action of the locking device 800. For example, a person should be allowed to pull the equipment away from the docking station 1000, whereby the spring biasing of the ball 860 could be adjusted to meet the specific requirements.

The locking devices 700, 800 described above are advantageous in that they are entirely passive components, requiring no electricity or control functionality. However, it would of course also be possible to provide the dockings stations 900, 1000 with other components for controlling the interaction with an approaching cart 400. Such other components may e.g. comprise sensors, magnets, solenoids, motors, etc.

In the following sections, a number of non-limiting examples will be presented in order to further the understanding of the concepts disclosed herein.

Figure 11A:
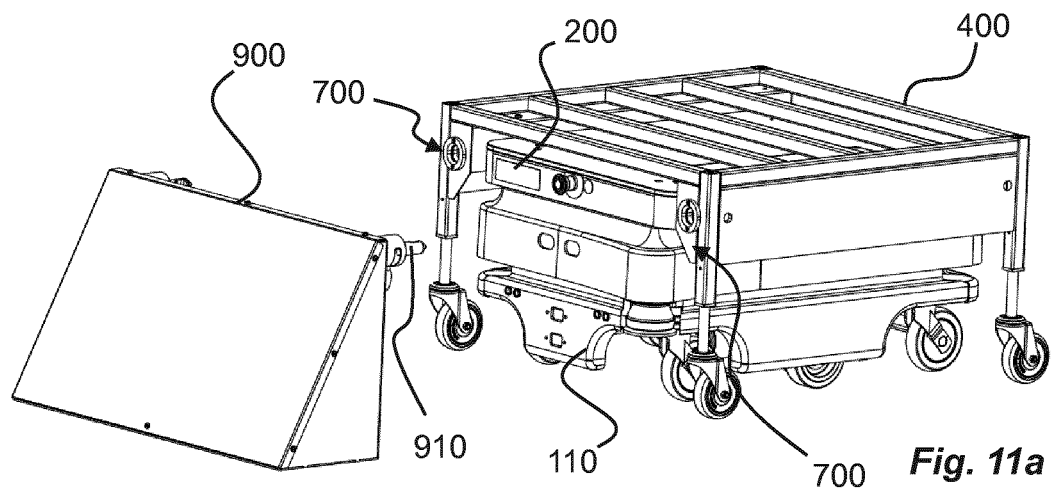
FIGS. 11a-c show a sequence for connecting a cart to a docking station by means of a mobile robot having a top module.
Figure 11B:
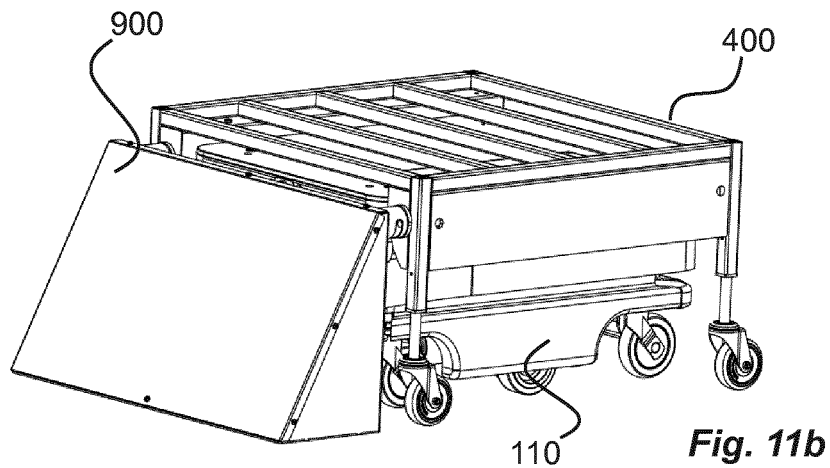
Figure 11C:
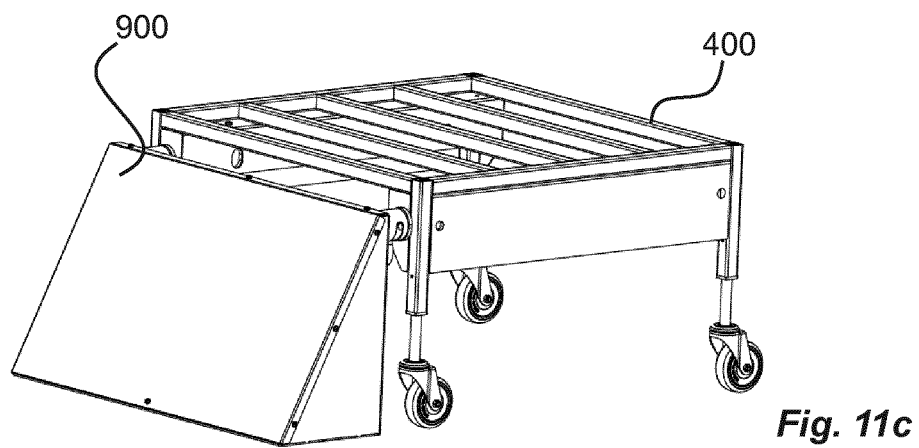

In FIGS. 11*a-c* a scenario wherein an associated equipment 400 in the form of a cart with wheels is transported by a mobile robot 110. The cart 400 will enable the mobile robot 110 to carry loads much heavier that those possible to carry directly on top of the mobile robot 110. The cart 400 is securely attached to the module 200 of the mobile robot 110 through locking devices 700 provided on the cart, as is shown in FIG. 11*a*. This means that the locking members 220*a*, 220*b*, 220*c*, 220*d* of the module 200 are in their projecting position. When the mobile robot 110 moves into a docking station 900, the associated locking bars 910 of the docking station will engage with the second engagement areas 720 of the locking modules 700 provided on the cart, FIG. 11*b*. When the module 200 moves its associated locking members 220*a*, 220*b*, 220*c*, 220*d* to be arranged fully within the housing 210 of the module 200, the cart 400 will be released from the mobile robot 110 when the mobile robot 110 leaves the docking station, as is shown in FIG. 11*c*. The reverse scenario of picking up the cart 400 is simply a matter of reversing the description above.

Figure 12A:
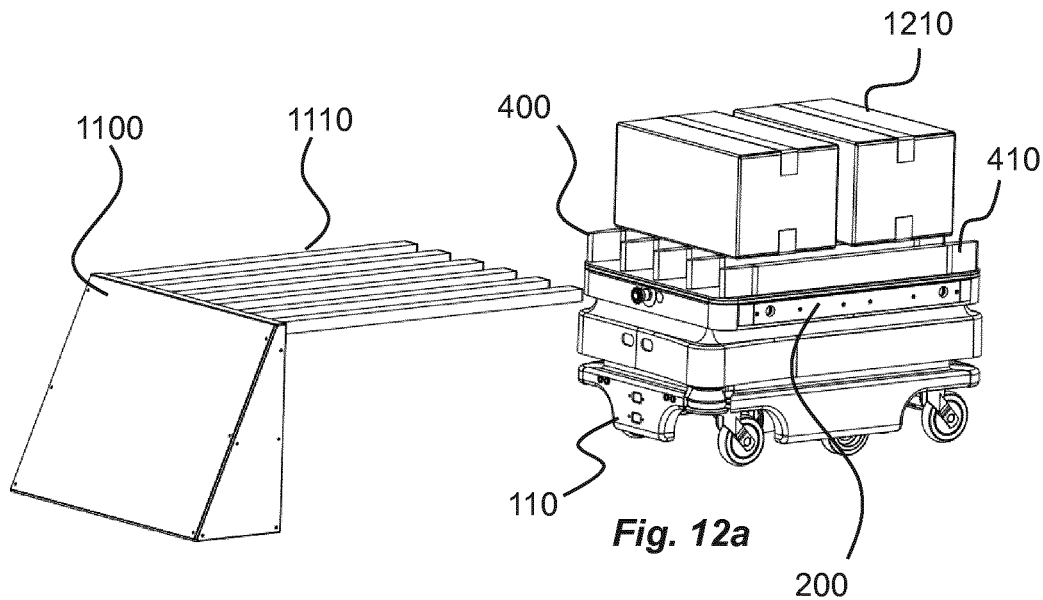
FIGS. 12a-c show a sequence for unloading packages from mobile robot having a top module.
Figure 12B:
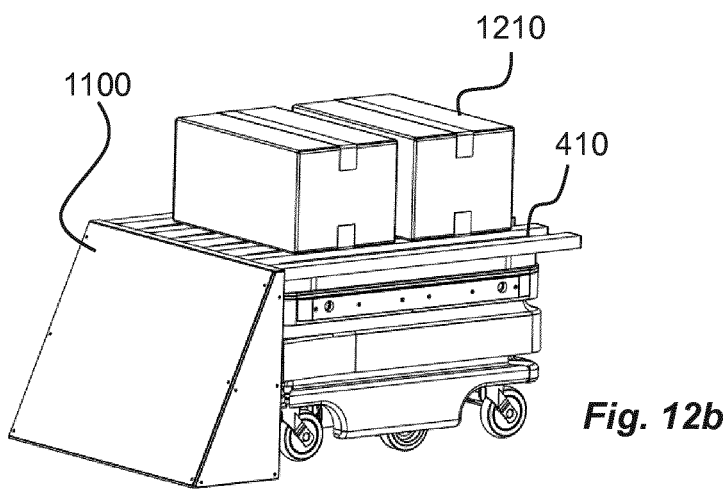
Figure 12C:
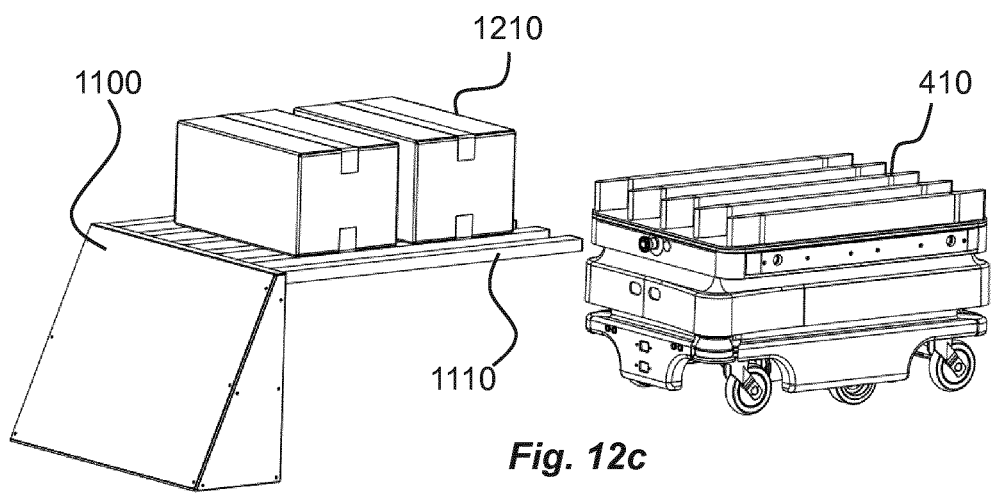

FIGS. 12*a-c* describe a scenario where the module 200 of the mobile robot 110 is provided with a pallet 410. The pallet 410 is arranged to engage with a structure 1110 of an associated docking station 1100 such that the 410 intertwines with the structure 1110 of the associated docking station 1100. When the mobile robot 110 approaches the docking station 1100, as is shown in FIG. 12*a*, the pallet 410 and the structure 1110 will intertwine, as is shown in FIG. 12*b*. By controlling the lifting device 260 of the module 200 such that the height of the module 200 is decreased, it is possible to leave an item 1210 on the associated docking station 1100 when the mobile robot 110 moves away from the docking station 1100. The reverse scenario of picking up the item 1210 is simply a matter of reversing the description above.

Figure 13A:
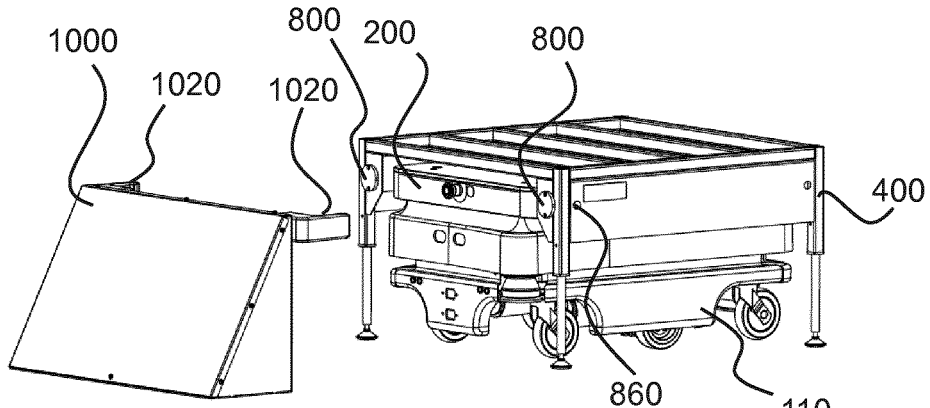
FIGS. 13a-c show a sequence for connecting a rack to a docking station by means of a mobile robot having a top module.
Figure 13B:
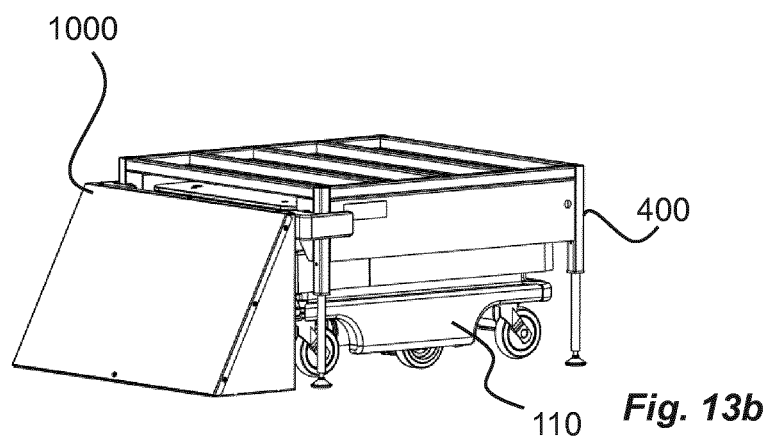
Figure 13C:
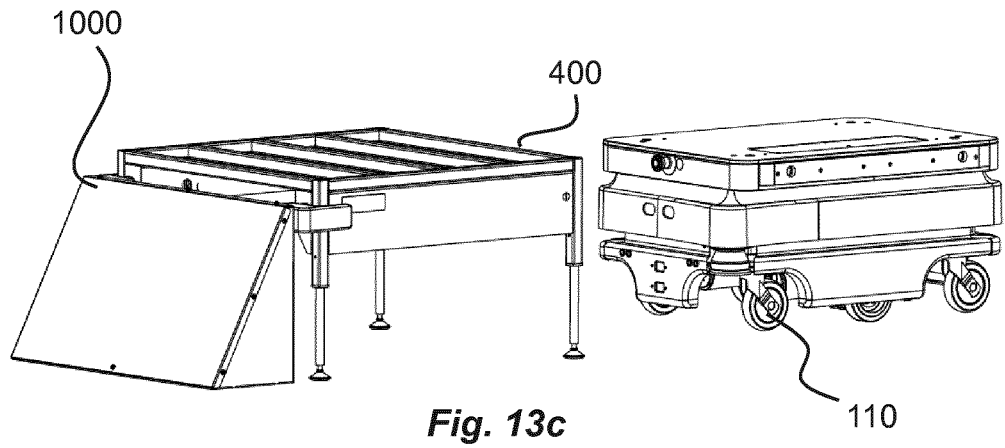

In FIGS. 13*a-c* a scenario wherein an associated equipment 400 in the form of a rack is transported by a mobile robot 110. The rack 400 is securely attached to the module 200 of the mobile robot 110 through locking devices 800 provided on the rack 400, as is shown in FIG. 11*a*. This means that the locking members 220*a*, 220*b*, 220*c*, 220*d* of the module 200 are in their projecting position. Due to the fact that the rack 400 has no wheels, the module 200 of the mobile robot 110 is in a vertically raised position by means of the lifting device 260 described earlier. When the mobile robot 110 moves into a docking station 1000, the balls 860 of the locking devices 800 will be aligned with the respective depressions 1020 docking station 1000. Thereafter, the module 200 is activated to lower its upper member mu such that the rack 400 stands of the floor. Since the depressions 1020 of the docking station 1000 have a vertical extension, the balls 860 of the locking device 800 are still aligned with the depressions 1020. When the module 200 moves its associated locking members 220*a*, 220*b*, 220*c*, 220*d* to be arranged fully within the housing 210 of the module 200, the rack 400 will be released from the mobile robot 110, but secured to the docking station 1000 as the balls 860 of the locking device 800 are now biased outwards, into the depressions 1020. The reverse scenario of picking up the cart 400 is simply a matter of reversing the description above.

The invention claimed is:

1. A top module for connecting a mobile robot to associated equipment for transport of goods, said top module having a housing defining the exterior of said module, wherein
   the top module is configured to be securely attached to an upper end of the mobile robot, and wherein the top module comprises a plurality of locking members each being moveable between an idle position, in which the locking member is arranged fully within said housing, and a projecting position, in which at least a part of the locking member extends outside the housing,
   wherein at least one locking member forms an actuator for a locking device of an associated equipment.

2. The top module according to claim 1, wherein each locking member is movable in a horizontal plane.

3. The top module according to claim 1, comprising a first pair of locking members being arranged to project out from a first side (s1) of the housing, and a second pair of locking members being arranged to project out from a second, opposite, side (s2) of the housing.

4. The top module according to claim 1, comprising a bottom part (mb) and an upper part (mu), said bottom part (mb) being configured to be securely attached to an upper end of the mobile robot, and wherein said locking members are arranged in the upper part of said top module, wherein the upper part includes a portion including or attachable to an upper support surface configured to support said goods.

5. The top module according to claim 4, wherein the bottom part of said module further comprises a lifting device being configured to move the upper part (mu) relative the bottom part (mb) in the vertical direction.

6. The top module according to claim 5, wherein the lifting device comprises at least one wedge-shaped member in cooperation with a moving member, such that vertical motion is accomplished by relative horizontal movement between the wedge-shaped member and the moving member.

7. The top module according to claim 5, wherein the housing has a rectangular shape, and wherein a lifting device is positioned in each corner of the housing.

8. The top module according to claim 1, further comprising a drive configured to move the respective locking member between the idle position and the projecting position.

9. The top module according to claim 8, wherein the top module is provided as a stand-alone unit to be mounted to the mobile robot.

10. An autonomous mobile robot, comprising the top module according to claim 1.

11. The mobile robot according to claim 10, wherein the top module is integrated with said robot.

12. A system, comprising the mobile robot according to claim 10, a docking station, and a cart or a rack.

13. A top module for connecting a mobile robot to associated equipment for transport of goods, said top module having a housing defining the exterior of said module, wherein
   the top module is configured to be securely attached to an upper end of the mobile robot, and wherein the top module comprises a plurality of locking members each being moveable between an idle position, in which the locking member is arranged fully within said housing, and a projecting position, in which at least a part of the locking member extends outside the housing, wherein the top module further comprises a bottom part and an upper part, said bottom part being configured to be securely attached to an upper end of the mobile robot, wherein said locking members are arranged in the upper part of said top module, and wherein the upper part includes a portion including or attachable to an upper support surface configured to support said goods, and wherein the bottom part of said module further comprises a lifting device configured to move the upper part relative the bottom part in the vertical direction.

14. A top module for connecting a mobile robot to associated equipment for transport of goods, said top module having a housing defining the exterior of said module, wherein:

the top module is configured to be securely attached to an upper end of the mobile robot, and wherein the top module comprises a plurality of locking members each being moveable between an idle position, in which the locking member is arranged fully within said housing, and a projecting position, in which at least a part of the locking member extends outside the housing, wherein the top module further comprises a drive configured to move the respective locking member between the idle position and the projecting position.

15. The top module according to claim 14, wherein the top module is provided as a stand-alone unit to be mounted to the mobile robot.

\* \* \* \* \*